United States Patent
Grisso et al.

(10) Patent No.: US 9,530,119 B1
(45) Date of Patent: Dec. 27, 2016

(54) SYSTEM AND METHODS FOR DYNAMICALLY APPLYING AN ELECTRONIC MESSAGING BUDGET TO MESSAGING ACTIVITIES WITHIN A BUSINESS

(71) Applicant: NETSUITE INC., San Mateo, CA (US)

(72) Inventors: Ryan Grisso, San Francisco, CA (US); Richard Wedenig, Palo Alto, CA (US)

(73) Assignee: NetSuite Inc., San Mateo, CA (US)

( * ) Notice: Subject to any disclaimer, the term of this patent is extended or adjusted under 35 U.S.C. 154(b) by 230 days.

(21) Appl. No.: 14/292,499

(22) Filed: May 30, 2014

Related U.S. Application Data

(60) Provisional application No. 61/831,233, filed on Jun. 5, 2013.

(51) Int. Cl.
| | |
|---|---|
| *G06F 15/16* | (2006.01) |
| *G06Q 10/10* | (2012.01) |
| *H04L 12/58* | (2006.01) |
| *H04L 29/08* | (2006.01) |

(52) U.S. Cl.
CPC .............. *G06Q 10/107* (2013.01); *H04L 51/12* (2013.01); *H04L 12/58* (2013.01); *H04L 67/22* (2013.01)

(58) Field of Classification Search
CPC ........ H04L 67/22; H04L 12/58; G06Q 10/107
USPC .......................................................... 709/206
See application file for complete search history.

(56) References Cited

U.S. PATENT DOCUMENTS

| | | | | |
|---|---|---|---|---|
| 8,738,611 B1 * | 5/2014 | Zarmer | ................ | G06Q 10/107 707/723 |
| 8,880,435 B1 * | 11/2014 | Catlett | .................... | G06Q 20/10 705/75 |
| 9,059,870 B1 * | 6/2015 | Sobel | ....................... | H04L 12/58 |
| 9,253,199 B2 * | 2/2016 | Engert | .................... | G06F 21/51 |
| 2003/0095651 A1 * | 5/2003 | Book | .................... | H04M 3/436 379/211.01 |
| 2008/0003997 A1 * | 1/2008 | Parkkinen | ............. | H04L 63/145 455/421 |
| 2010/0011071 A1 * | 1/2010 | Zheleva | .................. | G06F 21/55 709/206 |
| 2010/0042688 A1 * | 2/2010 | Maghraby | .......... | G06Q 30/0228 709/206 |
| 2011/0087741 A1 * | 4/2011 | Stern | .................... | G06Q 10/107 709/206 |
| 2012/0109794 A1 * | 5/2012 | Nathanson | ............. | G06Q 10/10 705/32 |
| 2012/0233222 A1 * | 9/2012 | Roesch | ............... | H04L 63/1408 707/812 |

* cited by examiner

*Primary Examiner* — Viet Vu
*Assistant Examiner* — Michael A Chambers
(74) *Attorney, Agent, or Firm* — Lane Powell PC

(57) ABSTRACT

A system and methods for establishing and enforcing an electronic messaging budget. In at least one embodiment, the inventive method involves identifying a set of users of an electronic message system. Next, an electronic message budget for the set of users is calculated or otherwise determined, and a portion of the budget is allocated to each user, group of users, department, or other suitable element, etc. In response to one of the users attempting to send an electronic message, a cost of the message is calculated and compared to that user's (or group's) available messaging budget. If the cost exceeds the budget, then the message may not be delivered or its delivery may be conditioned on some action of the user.

32 Claims, 6 Drawing Sheets

SYSTEM AND METHODS FOR DYNAMICALLY APPLYING AN ELECTRONIC MESSAGING BUDGET TO MESSAGING ACTIVITIES WITHIN A BUSINESS

CROSS REFERENCE TO RELATED APPLICATION

This application claims the benefit of U.S. Provisional Application No. 61/831,233, entitled "System and Methods for Dynamically Applying an Electronic Messaging Budget to an Enterprise Business Management Platform," filed Jun. 5, 2013, which is incorporated herein by reference in its entirety for all purposes.

BACKGROUND

Employees of a business generate large numbers of internally directed electronic messages, often including attachments or links to web pages. Processing all of these messages takes a significant amount of employee time and therefore company resources (and in addition requires use of other resources, such as network bandwidth, processing capabilities, messaging system infrastructure, etc.). Each email (and in some cases, the associated attachment, which may include a document or voice message) must be read, assessed, prioritized, and in some cases responded to or disposed of, etc. Some emails may be ignored or left for considering at a later time, but others may be forwarded, replied to, deleted, archived, etc. within a relatively short timeframe, particularly if they relate to a single "conversation". If an email arrives while the employee is engaged in work, then the interruption may slow the employee down regardless of whether or not the email is important, or even relevant to the employee's job or current task. Further, a significant percentage of received messages may be misdirected, ill-conceived, unnecessary, or otherwise inappropriate, which results in a misuse of company resources.

Many companies simply ignore the problems created by the non-productive processing of email or other messages because of the lack of a good solution, while others implement static rules like address or title filters that block messages based on pre-defined criteria. For example, members of a company's sales team with technical questions may attempt to contact the company's Engineering Department, instead of more appropriately addressing their inquiries to the Product Support team. In response to such messaging efforts, a company may employ a static email filter rule based on the source and destination email addresses that blocks (or redirects) email sent from Sales Team members to Engineering. The preceding example operates like a simple "spam filter," and, just like spam filters can sometimes register 'false-positives' by identifying legitimate email as inappropriate. For example, such a static rule can cast too wide a net and end up deleting (or failing to deliver) emails between Sales and Engineering staff that were not of a sales nature and should have been delivered to the intended recipient.

Such static message filtering rules are frequently defined by people outside of the scope of the actual business dynamics or operations involved in the messaging, such as by executives within a company's corporate structure or by people (such as those in the Information Technology (IT) Department) who are not directly involved in those dynamics or operations. Thus, such static rules are typically not optimal for accomplishing their purpose, nor are they easily adapted to complex and changing company policies or changing business processes. As a result, such static rules may either overly restrict communications in an attempt to be effective, or inadequately filter unwanted messages (for instance, because of a desire to prevent or reduce the blocking of messages that turn out to be "false-positives").

For example, if a company wants to restrict email communications along its organizational line of command, then the IT department might define a set of static rules based on the company's organizational structure. However, even if the initially defined rule set was effective, such organizational structures are dynamic and may change frequently (where some changes may be documented and others more informal in nature). As a result, it would likely be tedious and inefficient for the IT department to have to monitor changes to the company's structure in real-time and update the rule set accordingly as lines of responsibility and project teams change.

While existing data processing platforms and systems can provide business users with many useful functional and data processing capabilities, they do not provide a solution to the problem of employees spending time on the excessive and unproductive processing of emails and other forms of messaging. Similarly, conventional data processing, computing, and related systems or platforms do not provide sufficient tools to enable system administrators and management to effectively reduce the amount of unproductive time and other resources spent processing emails and other forms of messaging. Embodiments of the invention address this need both individually and collectively.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the invention are directed to a system and methods for establishing and enforcing an electronic messaging budget. In at least one embodiment, the inventive method involves identifying a set of users of an electronic message system. Next, an electronic message budget for the set of users is calculated or otherwise determined, and a portion of the budget is allocated to each user, group of users, department, or other suitable element, etc. In response to one of the users attempting to send an electronic message, a cost of the message is calculated and compared to that user's (or group's) available messaging budget. If the cost exceeds the available budget, then the message is typically not delivered.

In some embodiments, if the cost exceeds the available budget, then the user attempting to send the message may be notified and presented with one or more options to enable sending of the message. For example, the user may be permitted to send the message after agreeing to a restriction on the number or frequency of messages in the future, after agreeing to a delay in the sending of the message, after agreeing to a restriction on the recipient(s) of future messages, after agreeing to a restriction on the hours in which future messages will be permitted for a set time period, in exchange for permitting a reallocation of another type of resource budget, in return for a contribution to a fund or charity, etc. If desired, a messaging budget trading platform may be established to permit those individuals, groups, or departments in need of additional messaging capability to offer to purchase additional messaging capability in return for contributions to charity, transfer of other resources subject to a budget, etc.

In one embodiment, the invention is directed to a method for managing messaging communications, where the method includes:

identifying a user of an electronic message system;

determining an electronic message budget for the user;

determining that the user is attempting to send an electronic message;

calculating a cost of the electronic message;

comparing the cost of the electronic message to the user's electronic message budget; and preventing the message from being delivered if the cost of the electronic message exceeds the user's electronic message budget.

In another embodiment, the invention is directed to a multi-tenant data processing system, where the system includes:

one or more business related data processing applications installed in the system and accessible by a plurality of tenants of the multi-tenant data processing system;

a data storage element accessible by a plurality of tenants of the multi-tenant data processing system;

a processor programmed with a set of instructions, wherein when executed by the processor the instructions cause the system to determine that a user is attempting to send an electronic message;

calculate a cost of the electronic message;

compare the cost of the electronic message to the user's electronic message budget; and prevent the message from being delivered if the cost of the electronic message exceeds the user's electronic message budget.

Other objects and advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

DETAILED DESCRIPTION

Figure 1:
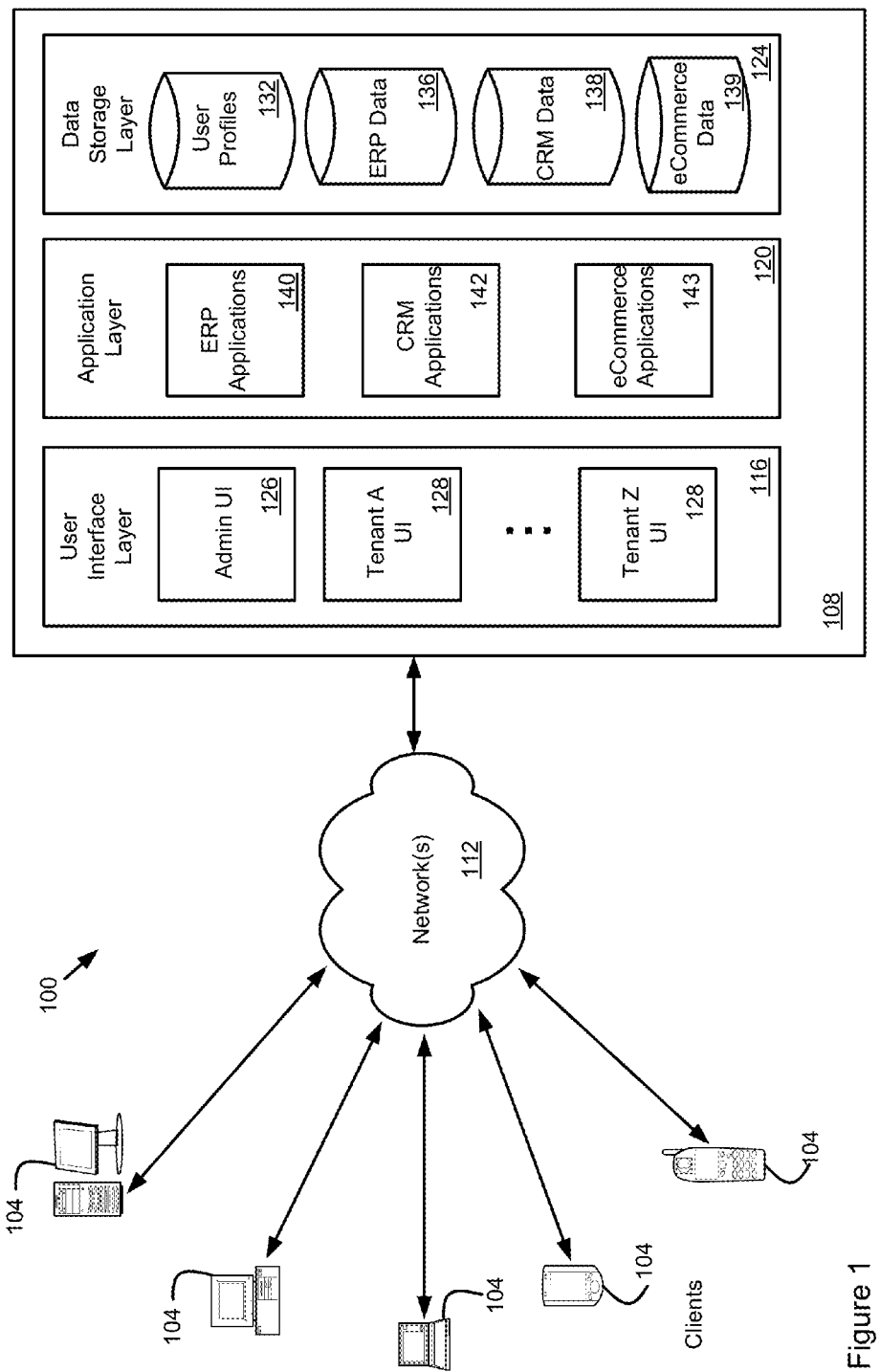
FIG. 1 is a diagram illustrating a computing environment in which an exemplary embodiment of the inventive system and methods described herein may be implemented.

Exemplary embodiments of the inventive systems and methods for determining and dynamically implementing a virtual electronic messaging budget within a multi-tenant distributed computing system or platform (or other form of system, network, platform, or apparatus for processing data and/or providing computing resources) are described herein with the specificity necessary to meet statutory requirements. However, this description is intended only to aid a person having ordinary skill in the relevant art in appreciating and understanding the subject matter defined by the claims which follow. Specifically, such a person will understand and appreciate the subject matter defined by the claims to be inclusive of alternative and/or additional embodiments, which may, for example, include different and/or additional elements or steps than those included in the described exemplary embodiments. Such a person will further understand that the scope of the claims is not limited to use of an embodiment of the claimed subject matter in conjunction with technologies explicitly described herein, and may be implemented with other suitable technologies, whether currently available or later developed. The term "exemplary," as used herein, is used to indicate an illustration of a thing's general characteristics, and not to indicate an ideal or otherwise preferred example or embodiment of that thing. This description should not be interpreted as implying any particular priority, order, or arrangement among or between various elements or steps of the described embodiments, except when such priority, order, or arrangement is explicitly described.

The description is provided with reference to the accompanying drawings in order to provide a person having ordinary skill in the relevant art with a full, clear, and concise description of the subject matter defined by the claims which follow, and to enable such a person to appreciate and understand how to make and use the same. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive entitlement.

Among other embodiments, the invention may be embodied in whole or in part as a system, as one or more processes, operations, methods, or functions, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The processor, microprocessor, CPU or controller may be a component or element of a computing device, communications network, or data processing device or platform (such as a client device, network component, or a server used with an associated data storage element or database). In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the inventive system and methods are generally directed to addressing the problem of the actual "cost" of the unproductive use of electronic messaging within an enterprise. In a world of global Gigabit network speeds and handheld gigabyte personal data storage devices, system bandwidth and data storage space are often assumed to be almost limitless resources and generally free of any cost (or at least incremental cost) for use. However, this (mis)perception may result in an undesirable and inefficient use of messaging services, with a significant but unappreciated human cost in terms of both lost time and productivity. In accordance with at least one embodiment of the inventive Electronic Message Costing System (EMCS), more efficient use of an enterprise business management platform (such as a multi-tenant distributed computing system or data processing platform) may be obtained by use of the inventive system and methods.

For example, a platform, system, or network may include an EMCS element or component that may be provided as part of a suite of enterprise related business applications by an enterprise or by an operator of a cloud-based multi-tenant system or platform. Implementing an EMCS in this way may advantageously add little or no cost or additional burden to existing system resources within an enterprise's network or within a 3rd party SaaS (Software-as-a-Service) provider's cloud infrastructure (although it may consume some additional data processing time). In return, embodiments of an EMCS that implements one or more of the inventive methods may achieve benefits and/or advantages by allowing enterprise employees, prior to sending an electronic message, to see an estimated "cost" of the message relative to a current message budget allocated to the employee. This may cause an employee to reconsider sending the message or to take an action that compensates for some portion of the costs involved in causing others to read and process the message. Other aspects of the inventive EMCS may enforce enterprise messaging budgets by causing the enterprise's communication servers to drop, block, re-route, and/or place a condition on the delivery of messages that exceed an employee's messaging budget.

In one embodiment, an EMCS system, element, or component may be configured by specifying a set of communications servers that will forward electronic messages for message cost evaluation. This may include providing one or more of a name, server type, message type(s), and network address. Business process rules may then be defined that establish a relative "cost" of communications between various departments, locations, or individuals, and the variance of this cost with one or more factors such as time of day, employee count, message type, message size, or message content. Note that some of these factors or message parameters may be determined by a message "re" line and/or key words within a message. The "cost" associated with a message or messages may be a dynamic quantity that changes based on one or more of system capacity, current system resource usage, time of day, day of week, business cycle, relative importance of sender, etc. Further, the "cost" associated with a message may depend on one or more factors that are combined or assigned a relative value in accordance with a predetermined set of rules or conditions (such as being a weighted sum of multiple terms, with the weights varying based on one or more of the example factors or system conditions).

In one embodiment, the inventive EMCS may use enterprise-defined budgeting rules with information about the company organizational hierarchy (and/or other company information available from an integrated business platform) to configure and execute a "costing" algorithm for each message (or group of messages) sent and/or received. Once configured, the EMCS may generate and store statistics on every (or some proportion, or category of) message that is (1) attempted to be transmitted and/or (2) actually transmitted, including such data as: sender, receiver(s), timestamp, unicast/multicast/broadcast type, content classification, and an estimated "cost". This data may be used by the EMCS to generate messaging budget/deficit reports at one or more of an individual level, group level, section level, department level, or corporate level. Peak communication periods (times during which messaging services are most in demand or most "costly" according to some algorithm) may be identified to assist network administrators in planning for resource allocation at those times. Similarly, periods in which messaging services are in less demand (or less "costly") can be identified and that information can be used to allocate system resources to other purposes.

As will be explained in greater detail, the cost determination and budgeting rules can be both situational and dynamic, so that sometimes or under some operational conditions the message cost to certain employees will be higher than to others. This may be used to increase the disincentive to the sending of messages by certain employees in order to enable them to more efficiently achieve certain business goals, discourage messaging on the part of certain employees or departments, or the sending of messages to certain employees or departments, etc. Note that in some embodiments, employees may request a messaging budget increase if their management determines that the messages they are sending are of higher value to the company and therefore should not be subject to the current level of cost/disincentive.

FIG. 1 is a diagram illustrating a computing environment 100 in which an exemplary embodiment of the inventive system and methods described herein may be implemented. As shown in the figure, a variety of client applications (not shown) incorporating and/or incorporated into a variety of computing devices 104 may communicate with a multi-tenant business data processing platform/system 108 through one or more networks 112. Examples of suitable computing devices 104 include personal computers, server computers, desktop computers, laptop computers, notebook computers, tablet computers, personal digital assistants (PDAs), smart phones, cell phones, and consumer electronics incorporating one or more computing device components, such as one or more processors. Examples of suitable networks include networks including wired and wireless communication technologies, networks operating in accordance with any suitable networking and/or communication protocol, private intranets, the Internet, etc.

The multi-tenant business data processing platform/system 108 (which may also be referred to as a multi-tenant distributed computing system or platform, or "cloud-based" computing architecture) may include multiple processing layers, including a user interface layer 116, an application layer 120 and a data storage layer 124. The user interface layer 116 may provide tenant specific user interfaces (such as a dashboard) 128, and may include graphical user interfaces and/or web-based interfaces. Note that a dashboard user interface may be advantageous for presenting enterprise related information to users in a compact form. Such enterprise related information may include information provided by one or more enterprise applications that are part of application layer 120, such as one or more of an enterprise resource planning (ERP) application 140, a customer relationship management (CRM) application 142, or an eCommerce application 143. Different users may have different access rights to enterprise related information as configured by an administrative user interface 126. User profiles 132 may have an administrator configured portion and a user configured portion (e.g., user configurable preferences). Data storage layer 124 may include ERP data 136, CRM data 138, or eCommerce data 139 which are stored in a suitable database and accessed by the respective ERP, CRM, or eCommerce application(s).

Figure 2A:
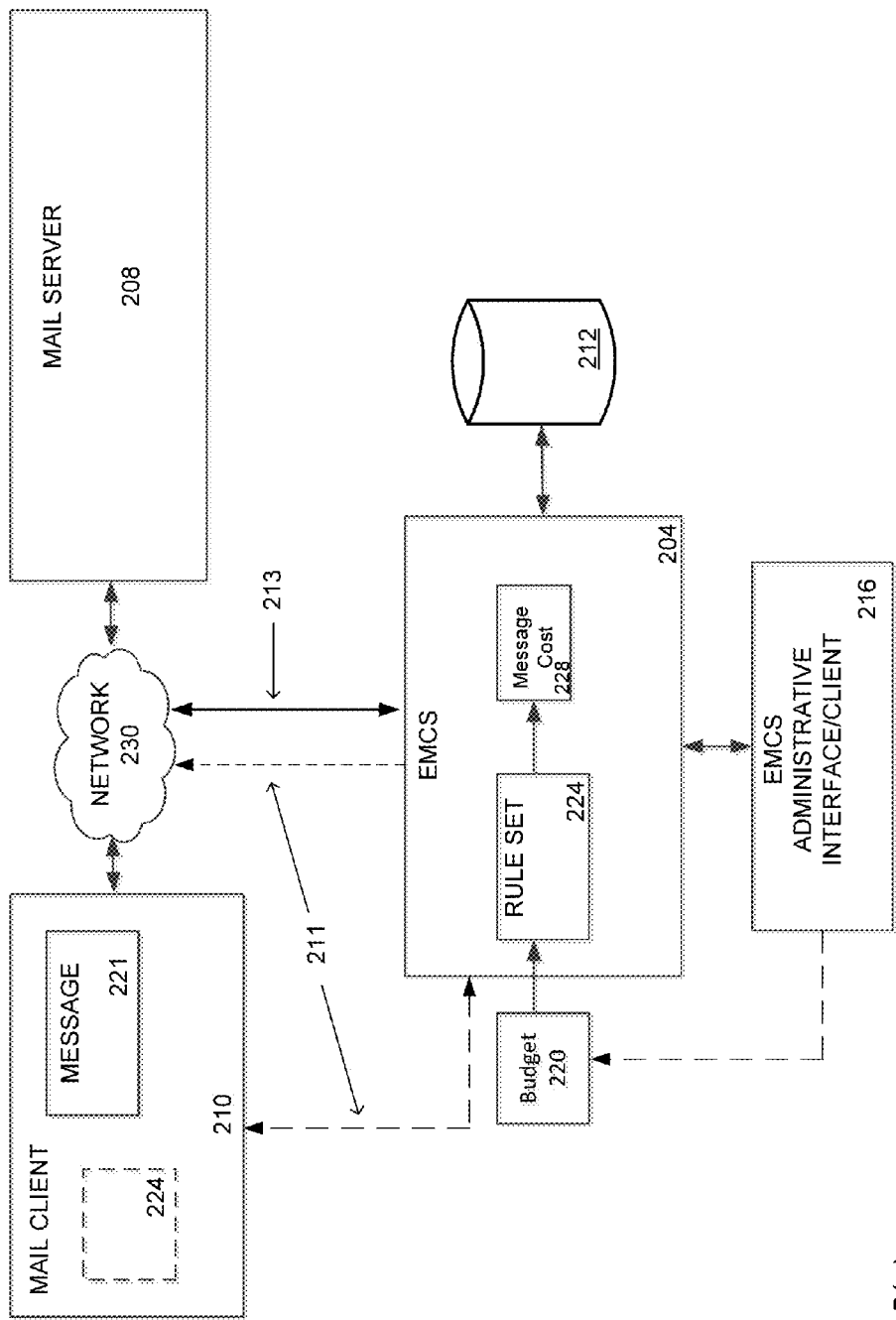
FIG. 2(a) is a block diagram illustrating components or elements of an electronic message costing system (EMCS) in which an embodiment of the invention may be implemented.

FIG. 2(a) is a block diagram illustrating components or elements of an electronic message costing system (EMCS) which may be used in implementing an embodiment of the invention. In one embodiment, in order to induce employees to make reasoned decisions (i.e., more optimal decisions with regards to resource allocation, network usage, distractions caused by messages to a message recipient, reduced productivity on their own part by engaging in messaging, etc.) regarding writing and disseminating electronic messages (both internally and externally), an enterprise may create an electronic message "budget" 220 for the company. The budget may take into account factors that include but are not limited to season, month, time of day, infrastructure demand, business cycle, number of employees, or other relevant information. Portions of such a budget may be allocated to different parts of the enterprise, for example to each division, department, group, and/or individual employee within a company. When an employee drafts and sends an electronic message 221 (typically by using a suitable application, such as mail client 210), and before the message is delivered, the EMCS system/application 204 may operate to calculate a "cost" of the message 228 in its present form and compare the calculated cost to the employee's electronic message budget, and/or the message budget of the employee's group, department, division, etc.

In one embodiment, this may lead the inventive system to reject the message (thereby preventing a user from sending it to the recipient(s)), to identify ways in which the "cost" might be reduced in order to bring the cost within budget and permit it to be sent (which may involve a "purchase" of additional messaging capacity, agreement to a specified condition, modification of the message, etc.), or to determine that the cost is within budget and that the message can be sent. Note that while the following example primarily refers to electronic messages in the form of email, embodiments of the inventive EMCS and associated methods are capable of performing the same or similar monitoring, evaluation, and resource allocation operations for other types of electronic messaging, including but not limited to text, SMS, messages with document, image, audio, or video attachments, etc.

One or both of a message's "cost" or the applicable messaging budget or budgets relevant to a particular message may be dependent on one or more factors, characteristics, values, etc. For example, factors that influence the budget for a message include, but are not limited to expected workloads or projects of an individual, group, section, project, or division. Other possible factors include the role of an individual within a team, group, division, or the organization, the time of year, the product cycle of the company (as it would be expected that messaging might be needed more during certain times of year or stages of a product cycle or that excessive messaging might be unnecessarily distracting during certain times of year or stages of a product cycle, etc.), the status of the company's network infrastructure, etc.

The relevant factors may then be combined to form an expression or calculation for determining a budget for the applicable individual, team, group, division, etc. The expression or calculation may be based on any suitable combination of the factors, and be expressed in terms of fixed values, a range of values, a dynamic function of the number of employees, number of team members, development stage of a project, time until a certain event or milestone, etc. The expression may be an arithmetic sum, a weighted sum, a product of factors, an evaluation of a threshold, an evaluation of one or more rules or conditions (e.g., "If factor A has a value in the range (A1 to A2) and factor B has a value of B1, then budget equals X" or "If the sum of budgets for all employees on team A is less than X1, then budget for new employee on team is X1/number currently on team, otherwise budget for new employee equals X2", etc.).

Similarly, the "cost" for a particular message may depend on one or more factors or characteristics of the message. These may include, but are not limited to message length, time of day message was attempted to be sent, date, project status of sender and/or recipient of message, project type/goal, project priority, message attachments, type of message attachment, number of recipients, type or role of sender and/or recipient(s), current status of recipient(s), number of messages from same sender sent to recipient over specified time period, number of messages from same sender sent to all recipients over specified time period, etc. As with the budget expression or calculation, the cost for a message may be determined based on one or more calculations or combinations of the relevant factors. Such calculations or combinations may be expressed as a fixed sum or weighted sum, a non-linear function of one or more variables, a geometric progression of the number of messages, size of attachments, etc., a multi-factor term, etc. The cost associated with a message may be static or dynamic, and may depend on business related data (such as ERP, CRM, eCommerce, financial, Human Resources, etc.).

As noted, FIG. 2(a) illustrates components or elements of an embodiment of the inventive electronic message costing system and its associated methods. As shown in the figure, an EMCS system/application 204 may be in data communication with an electronic mail server system, application or platform ("email server") 208 and/or one or more instances of a mail client application ("email client") 210, typically by means of a communications network 230. The EMCS system/application 204 may be in data communication with an EMCS database 212 for storing indexed information related to the operation of the EMCS system/application 204 and the messages processed by the application.

The EMCS system/application 204 may also be capable of data communication with one or more instances of an EMCS administrative client 216 or interface which may be used to assist in configuring aspects of the operation of EMCS system/application 204 (such as setting parameter values for the budget or cost calculations, etc., as suggested by the dashed line between administrative client 216 and budget 220).

In one embodiment, the EMCS system/application 204 monitors electronic messages (e.g., by intercepting or delaying transmission of a message or data to mail server 208) composed by users (not shown) of mail client 210. When a user composes a message 221, the message is received/intercepted by EMCS system/application 204. EMCS 204 evaluates or "tests" the message 221 against a set of rules 224 (which as noted, may be specific to the user and based on their position or role within an organization or group), and based on the outcome may calculate a message cost 228 to the user for permitting transmission of the message 221.

Note that in one embodiment and example system architecture, EMCS system/application 204 may be positioned between mail client 210 and network 230 so that generated messages are passed from mail client 210 to EMCS 204 for processing and evaluation, and then passed from EMCS 204 to network 230 for distribution to mail server 208 if they are approved for sending (as suggested by the dashed lines 211 in the figure). In such an embodiment, EMCS 204 may be embodied as a set of methods, processes, functions, or operations executed by a suitably programmed processing element that is part of a computing device located within the same intranet as mail client 210. In such a case the business organization that employs the user of mail client 210 may also operate the EMCS 204 as part of its message processing services before any such messages are provided to an external mail server.

However, in another embodiment or example architecture, EMCS 204 may be operated as a service externally to the business organization that employs the user of mail client 210. In this embodiment, messages may be passed from mail client 210 to network 230 and then to EMCS 204 for processing and evaluation. After processing by EMCS 204, the messages may be passed to network 230 for transmission to mail server 208 (as suggested by the solid lines 213 in the figure). In this embodiment the processes, methods, functions, or operations performed by EMCS 204 may be performed by a suitably programmed processing element that is part of a remote server and is operated as part of a web-service, cloud computing, or Software-as-a-Service platform (SaaS). This embodiment may be utilized by having messages composed using mail client 210 automatically routed to EMCS 204 instead of to mail server 208 (by means of address replacement or altering a header of the message). After processing, if EMCS 204 determines that the message is suitable for transmission (i.e., its cost is within the parameters of the budget), then the address of the recipient may be re-inserted, the header changed, or another process used to reformat the message so that it may be properly processed by mail server 208 and sent to the intended recipient.

Note that if EMCS 204 is operated as part of a remote system or data processing platform, then it may be implemented as a business application similar to an ERP, CRM, eCommerce or other application that is made available to tenants of a multi-tenant data processing system or platform (such as that described with reference to FIG. 1). In such a situation, dynamically varying business related data (such as that obtainable from one or more of an ERP, CRM, eCommerce, or other business application) may be used either alone or in combination with organizational data and/or pre-defined rules to provide more accurate estimates of the "cost" associated with a particular message or group of messages.

For example, in addition to being dependent on the identity of a sender and/or recipient, the cost of a message may be a function of certain data or events that are part of one or more of an ERP, CRM, or eCommerce application's functions (e.g., number of sales, sales leads, closed leads, volume or rate of orders received via an eCommerce platform, volume or rate of orders processed, inventory levels, profits, achievement of business goals, current or projected infrastructure load, etc.). This permits the cost associated with a message to be dynamically determined in response to the real-time or pseudo real-time events within (or the status of) a business organization. As a result, the cost associated with a message will presumably be a more accurate reflection of the actual situation within a business, and will lead to creating more effective incentives for achieving the organization's desired goals (because in response to a more accurate determination of the cost of a message, potential message senders can be expected to adjust their messaging behavior to provide better alignment with the organizational goals reflected by the rule(s) and cost algorithm(s)). Note further that in addition to the cost of a message, the messaging budgets may be dynamic and dependent upon the business related data and its real-time values. For example, a messaging budget may be dependent upon revenue velocity, sales velocity, open sales leads, profit margin goals, employee head count, project head count, etc.

Regardless of the system architecture or system configuration in which it is implemented, embodiments of the inventive EMCS system and methods are operable to determine a message cost 228 for one or more electronic messages 221 generated by mail client 210. Such a cost 228 may be determined (in whole or in part) by applying one or more rules or conditions 224 to the message, where such rules or conditions may be based on business processes, business data, and/or company policy. The rules or conditions 224 may be defined in terms of characteristics and/or parameters of the message 221, such as message timestamp, sender-receiver classification or role within the organization, message unicast/multicast/broadcast type, message size, number or type of message attachments, or other relevant message content metrics. Note that the EMCS message evaluation processes may be applied to all messages generated by mail client 210, or to a sub-set of such messages with the sub-set determined by one or more of the message sender, message recipient, message size, time of day, the presence or absence of attachments, the presence or absence of certain key words in the message subject line, etc. Note further that rules or conditions 224 may be static in nature, dynamic in nature, or be a combination of both static and dynamic in nature. Further, as noted the factors or parameters used to determine the budget and/or cost of a message may depend on business related data or events, such as that processed by an ERP application, CRM application, or eCommerce application associated with a specific business.

Note that in one embodiment, the set of rules or conditions 224 may be stored or originally defined/configured by an interface to mail client 210 (not shown) and then communicated to EMCS 204 (as suggested by the depiction of rules 224 associated with mail client 210 in the figure and dotted lines 211), where that set of rules or conditions may be applied to messages generated using mail client 210. In this way a set of rules or conditions specific to each organization (and hence associated with each of one or more mail clients 210) may be defined by the relevant organization and then applied by the EMCS (which in such case may store multiple rule sets for application to messages generated by different organizations). In this embodiment, a different rule set may correspond to each of multiple tenants using a multi-tenant platform, and/or to each of multiple mail clients used by an organization (e.g., a different rule set may apply to mobile device based mail clients or to mail clients associated with a specific operational branch of an organization).

Figure 2B:
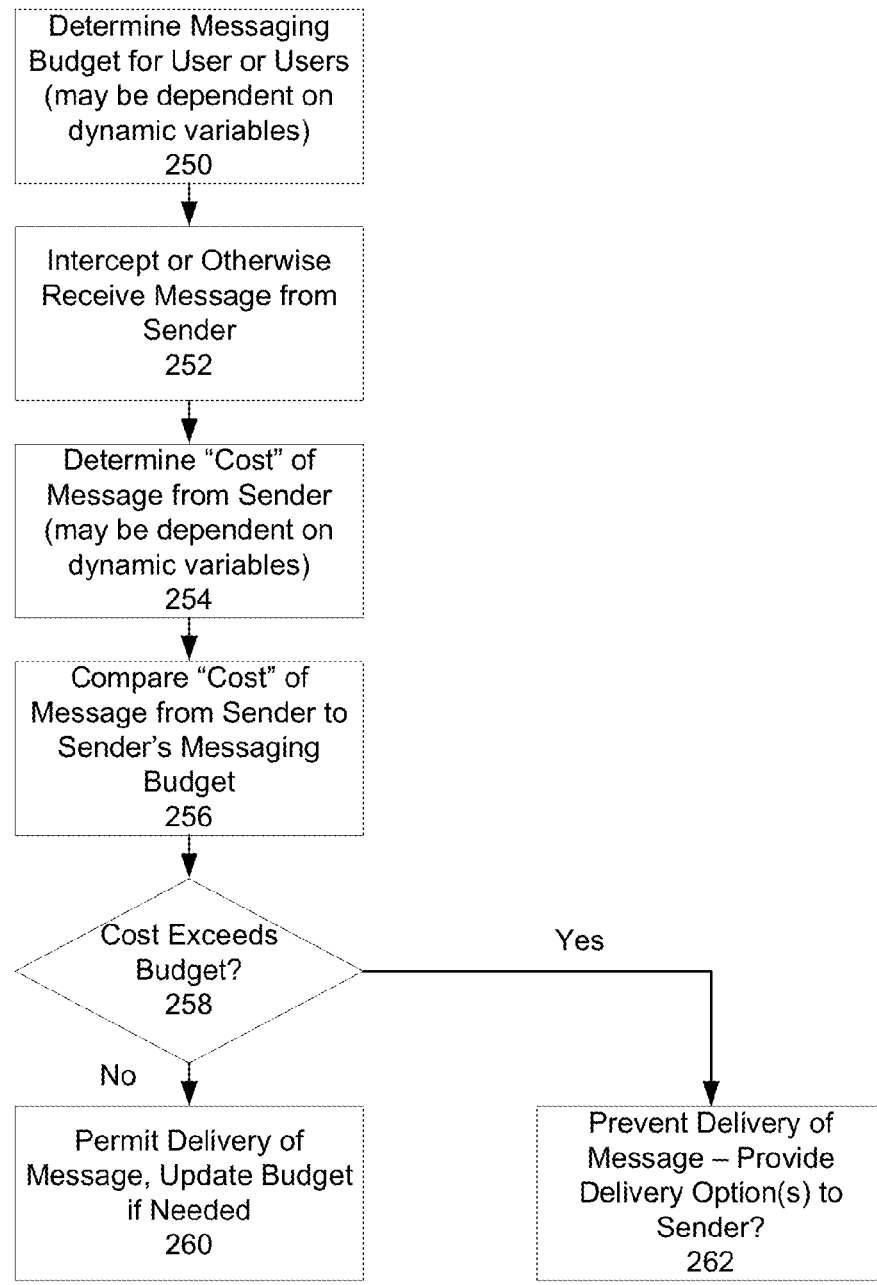
FIG. 2(b) is a flow chart or flow diagram illustrating the steps or stages of a process, method, function, or operation that may be implemented as part of the inventive system illustrated in FIG. 2(a)

FIG. 2(b) is a flow chart or flow diagram illustrating the steps or stages of a process, method, function, or operation that may be implemented as part of the inventive system illustrated in FIG. 2(a). As shown in the figure, in one embodiment, an implementation of the inventive system may include a step or stage of determining a messaging budget for a user or users (step or stage 250). The budget may be a function of (or otherwise dependent on) one or more factors, including but not limited to one or more of (a) the user's role within an organization, (b) a project the user is working on, (c) a task the user is working on, (d) the season of the year in which the user attempts to send the message, (e) the month of the year in which the user attempts to send the message, (f) the time of day at which the user attempts to send the message, (g) the current or projected demand on an organization's computing or network infrastructure, (h) a stage in the organization's business cycle, (i) a number of employees in the organization, or (j) an operational characteristic of the user's group or a larger component of the organization (e.g., milestones reached, goals achieved, revenue generated, profits generated, sales numbers, etc.). Further, the budget may be determined for a single user, a group of users, a team within an organization, a division of the organization, or an operating unit of the organization, where some of those groups may include the user sending the message, etc. Still further, the budget may be a function of (or otherwise dependent on) one or more factors, where a factor or factor may be static, dynamic, determined in advance, determined in real-time or pseudo real-time, etc.

Next, at step or stage 252, a message or messages that a user is attempting to send are intercepted or otherwise received (e.g., by being routed to the inventive system or application via address replacement, etc.). The message or messages are then subjected to processing to determine a "cost" associated with the message or messages (step or stage 254). The cost associated with a proposed message may be a function of (or otherwise dependent on) one or more factors, including but not limited to one or more of (a) the message length, (b) the time of day the message was attempted to be sent, (c) the date the message was attempted to be sent, (d) a project status of the sender or a recipient of the message, (e) a project type, (f) a project priority, (g) a type or number of message attachment(s), (h) a number of recipients of the message, (i) a type or role of the sender or of the recipient(s) of the message, (j) a current status of one or more of the recipient(s) of the message, (k) the number of messages from the same sender sent to a recipient over a specified time period, (l) the number of messages from the same sender sent to all recipients over a specified time period, (m) the current or projected demand on an organization's computing or network infrastructure, (n) a stage in the organization's business cycle, or (o) an operational characteristic of the user's group or a larger component of the organization (e.g., milestones reached, goals achieved, revenue generated, profits generated, sales numbers, etc.). Further, the cost may be a function of (or otherwise dependent on) one or more factors, where a factor or factor may be static, dynamic, determined in advance, determined in real-time or pseudo real-time, etc.

The determined cost for the sending/delivering the message or messages is then compared to the sender's messaging budget (or the appropriate portion of a larger group's messaging budget), as suggested at step or stage 256. A suitable comparison process may be implemented, including but not limited to application of a threshold function, application of a mathematical relationship (greater than, greater than or equal to, greater than a multiple of a budget value, greater than a percentage of a budget value, etc.), as suggested at step or stage 258. If the "cost" does not exceed the allocated messaging budget (as suggested by the "No" branch of step 258), then the inventive system permits delivery/transport of the message (step or stage 260), and may update the impacted budget or budgets if desired. If the "cost" does exceed the allocated messaging budget (as suggested by the "Yes" branch of step 258), then the inventive system may prevent delivery/transport of the message (as suggested by step or stage 262). Further, in some embodiments, the message sender may be provided with one or more options that would enable delivery of the message. These options may include a modification to the message, purchase of additional messaging budget, agreement to fulfill an obligation, agreement to perform a task, etc.

Figure 3:
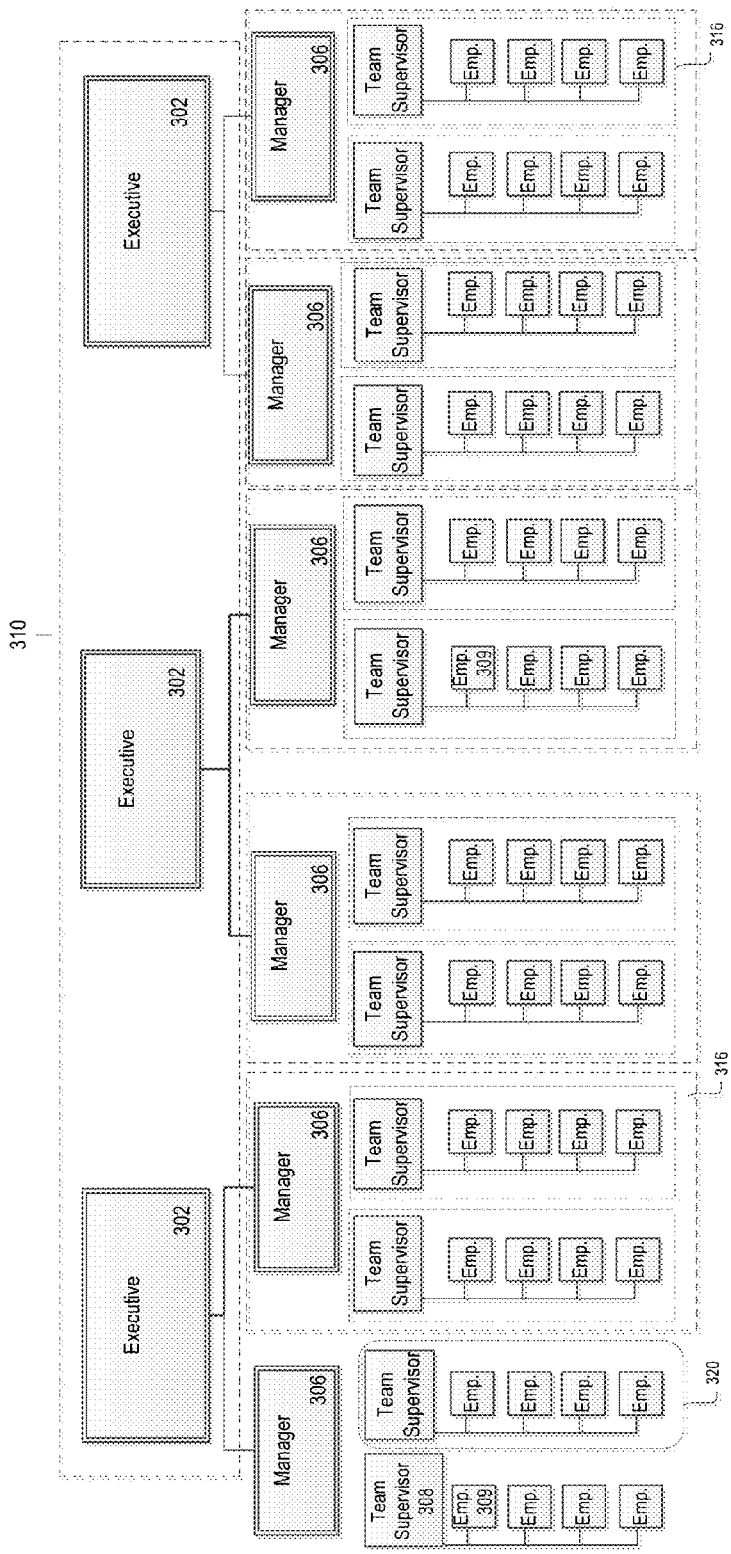
FIG. 3 is a diagram illustrating individuals within a business organization and is used to explain their role in implementing an embodiment of the inventive system and methods.

FIG. 3 is a diagram illustrating individuals within a business organization and is used to explain their role in implementing an embodiment of the inventive system and methods. Specifically, FIG. 3 is an organizational chart of an enterprise and is used to demonstrate the allocation of an electronic messaging budget, where that budget may be used in an implementation of an embodiment of the invention. Referring to FIG. 3, certain individuals within a company 300, typically those in management roles such as executives 302, managers 306, and/or team supervisors 308, may define (or approve) message costing rules for individual employees 309, and/or groups of employees (e.g., a division or group 316 under the particular management-role individual's supervision). For example, an executive committee 310 may define a company-wide policy regarding electronic message cost and then allocate responsibility to enforce the company wide policy among executives 302 in charge of various divisions of the company. An executive 302 in charge of a division, such as Sales, Marketing, and/or Engineering, may then decide how to best apply the company wide policy to their division's particular focus, operational methods and goals. This will typically result in the development of a baseline rule set which will be applied to groups 316 within the division, and may include optional rules or conditions to enable tailoring the baseline rule set to better satisfy the specific needs or operational concerns of each group 316 within the division. Managers 306 of the various groups 316 may then customize the baseline rule set, within the broad guidelines defined for the division, for application to electronic messages sent and/or received by members 309 of teams 320 within the group 316, and a team supervisor 308 may further customize the rule set for application to individual team members 309.

As an example, a significant percentage of intra-company electronic messages may be messages exchanged among individual employees within a particular team 320 or group 316. As a high-level policy, the company 300, for example acting through an executive committee 310, may decide that such messages should have a relatively low cost, because such employees will frequently need to communicate in such a manner and should not be discouraged from doing so. However, a team leader in the Sales group may wish to encourage his/her employees to focus on communicating with customers, and thus wish to apply a multiplier or other adjustment to increase the cost of such intra-team messages. As long as the selected multiplier or other customization fits within the rule set criteria defined by the higher levels of the organization, the team leader may be permitted to customize the rule set applied to his/her employees.

In another example, a manager may believe that "broadcast" emails sent to multiple individual recipients or to lists of recipients generally reduce productivity, and thus may define a rule to apply a higher cost to an intra-group email as a function of the intended number of recipients. Similarly, a defined rule may apply a higher cost to messages that "carbon copy" ("cc") and/or "blind carbon copy" ("bcc") one or more individuals based on the use of that copying technique, the number of individuals copied, the role of the individuals copied, etc. Note that to discourage use of the carbon copy and/or the blind carbon copy mechanism (or any other mechanism, such as message forwarding with attachments), a rule may impose a proportionally greater cost on messages that utilize the mechanism.

As described herein, embodiments of the inventive system and methods may allow configuration and definition of a rule or rules that can be used to evaluate a proposed message and assign an absolute or relative cost to the message. In one embodiment, the "cost" of a message may depend on some combination of weighted values of factors that are based on the rules or conditions, such as being dependent upon one or more of the identity of the sender, the identity or identities of the intended recipients, the messaging mechanism(s) used, the message size or content, the presence of an attachment, the type of attachment, etc. Note that by incorporating certain factors into the rules and adjusting the relative weights given to factors, the rule or rules may be used to create an incentive or a disincentive for certain employees to send messages, for certain employees to be the intended recipients of a message, for use of certain messaging mechanisms, for generating messages with certain characteristics, etc. Note also that a rule or rules may be constructed in terms of sender and/or recipient characteristics, and may be applied on the sending side and/or on the receiving side of a message. Thus, a proposed message may be evaluated in terms of its cost impact on the sender's messaging budget and/or on the messaging budget of one or more of the intended recipients. This may allow an organization to create incentives or disincentives for messaging behaviors at a more focused level and in response to dynamic changes in the business needs and operational aspects of the business over time.

For example, recipient-based rules (which may be applied at the sending side of a message or at the receiving side) may be applied to reduce the reception into a mailbox or account of a message based on the characteristics of one or more of the sender, the message, or the intended recipient, and may be formulated by a manager of a set of potential recipients. For example, a rule may increase the cost of all messages addressed to an engineering team that is working on a particularly critical project in order to reduce the interruptions caused by messages directed to that team from employees outside of the team. Similarly, a Sales Manager may wish to restrict general messages to the top sales people (so that they can focus on sales) and have junior sales people receive and respond to such messages. In this example, the manager could create an EMCS rule to increase the cost for addressing messages to the top people in Sales (the identities of which may change over time, and would be reflected by the CRM and perhaps other sources of data).

The EMCS system and application may determine an overall electronic message budget for a user and, if the user's budget is sufficient to afford the "cost" of a message, may transmit information about the message cost and the user's electronic message budget (or the amount available) to the mail client for display to the user. If the user's budget is not sufficient to afford the cost of the message, then the EMCS application may instead inform the user that he/she cannot afford to send the message in its current state. In one embodiment, the EMCS application may further suggest that the user alter the message to lower its message cost and may provide suggestions for how the user may do so (e.g., by reducing the number or size of attachments, by reducing the number of intended recipients, by removing one or more intended recipients who are members of a particular group, etc.).

Further, in one embodiment, a message which cannot be transmitted to one or more of the intended recipients because of the lack of sufficient "budget" may be subject to one or more conditions, the fulfillment of which may permit its transmission. Such conditions may include permitting the user who desires to send the message to purchase additional messaging budget, to negotiate for additional budget with a party having available budget, to perform a suitable task (such as to make a charity donation, accept responsibility for a business task, etc.) in return for which additional messaging budget will be provided, or to access a messaging budget trading platform to "bid" for additional budget, etc.

As mentioned, the EMCS component and one or more of its associated functions may be implemented as a feature of a 3rd party SaaS provider's application or multi-tenant computing platform. The EMCS and its functionality may thus exist within a "computing cloud" and be available as a web service in which it is provisioned for interacting with and providing services to multiple customer accounts (i.e., multiple "tenants" of the platform or system). In such an implementation, integration between a company's internal and third party communication servers may be accomplished through web services calls to an EMCS API via the SaaS provider's web services interface.

Figure 4:
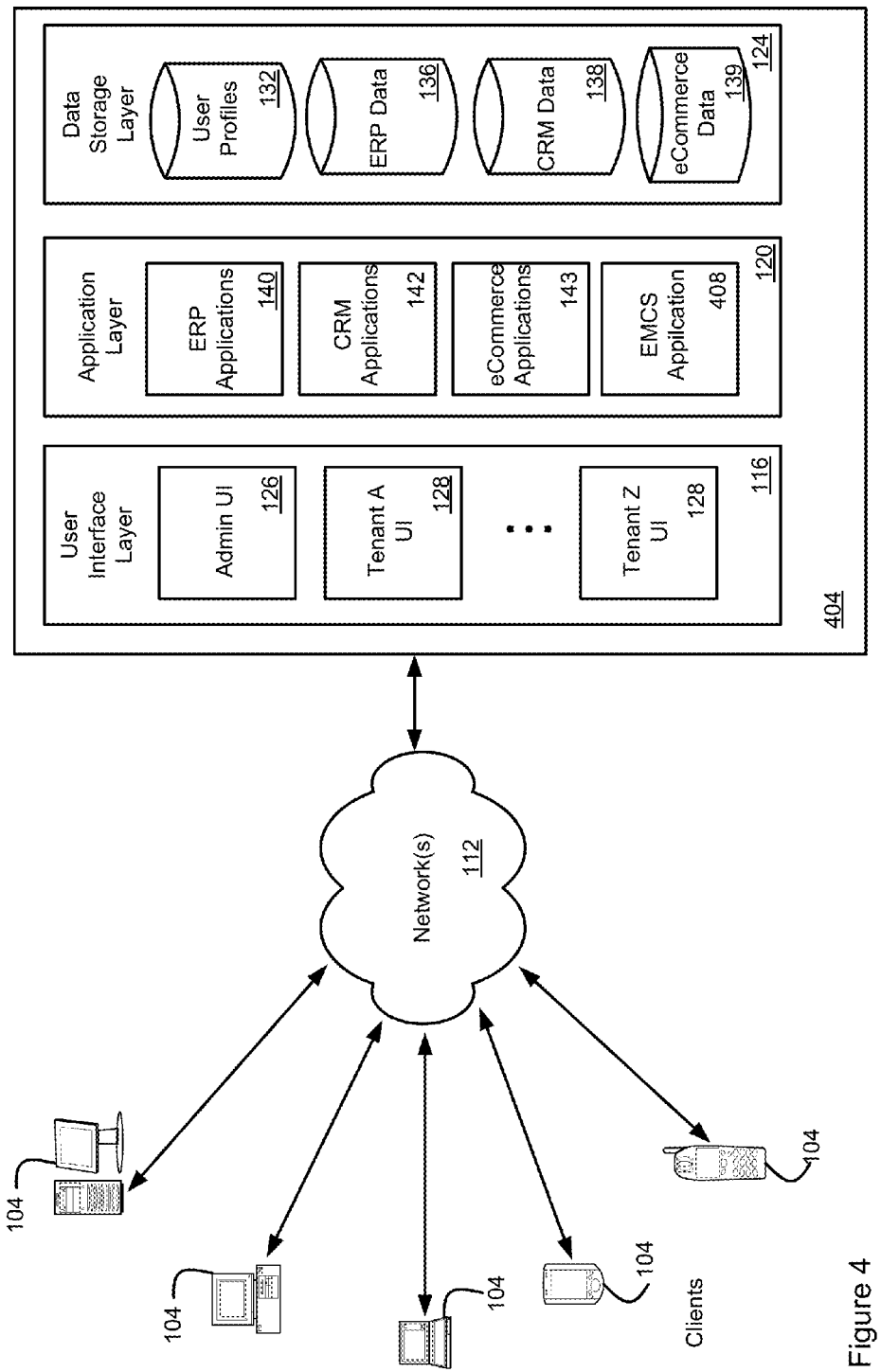
FIG. 4 is a diagram illustrating a multi-tenant distributed computing system (such as an enterprise information system) 404 in which an embodiment of the inventive EMCS 408 is implemented.

FIG. 4 is a diagram illustrating a multi-tenant distributed computing system or platform (such as an enterprise information system) 404 in which an embodiment of the inventive EMCS 408 is implemented. Note that a conventional multi-tenant enterprise information system, such as that described with reference to FIG. 1 (element 108), may benefit from integration with various embodiments of the EMCS 408, and the functional capabilities of the EMCS 408 may benefit from access to the additional data and functionality of multi-tenant distributed computing system 404. For example, such integration may permit definition and application of message costing rules which take into account current data or information regarding the state of the company, where such data or information may change over time. As an example, this permits construction and use of a rule that dynamically determines who the current top sales people are every time a message is directed to anyone in Sales (e.g., by access to data stored and processed as part of CRM applications 142). By using such a rule, the Sales manager for an business may be able to help ensure that the best performing sales people at any point in time are spared from unnecessary interruptions that could be properly handled by others.

As described herein, in one embodiment, the cost that is determined for a message may be used by the inventive system to enforce company messaging etiquette rules, such as by warning senders of the cost of sending certain messages and/or blocking messages that exceed the sender's and/or recipient's messaging budget(s). Unlike the case with a conventional (i.e., static) set of rules, because an embodiment of the inventive EMCS system may be integrated into a multi-tenant distributed computing system (such as an enterprise information system) and thereby have access to real-time company information (including business process rules, reporting structure, financials, ERP data, CRM data, eCommerce platform data, etc.), the combined EMCS and business information system 404 may use both static and dynamic rules to determine the cost and/or budget applicable to a particular message. In this way the combined system may more effectively create incentives or disincentives for messaging in response to changes in the state of the business and/or outside conditions, changing priorities, urgent issues, etc.

An embodiment of the inventive system and methods that includes an integrated EMCS solution (i.e., an EMCS integrated with an enterprise business information system or platform) is able to take advantage of the capabilities described herein, whereby a messaging server may make a synchronous call to the EMCS to request a cost estimate for a message (as well as the current value of the relevant messaging budget) prior to further processing and transmission of the message. This information can then be made available to the employee-sender, who can (if desired) interact with EMCS to "tune" their message to reduce its cost before they send it. An alternate implementation of the inventive system and methods might involve an enterprise communications server forwarding all sent messages to a passive EMCS configuration, to be used for message costing and reporting purposes (and ultimately to assist in developing budgeting and costing policies). Such a passive configuration allows for data gathering but lacks the capability to enforce messaging budgets or policy in real-time or pseudo real-time situations.

Note that by collecting and processing data related to the operation of an EMCS, such as messages that are created, messages that exceed the available budget, message costs, message costs as a function of sender, intended recipient, or content, requests for additional messaging budget, or any other data or information resulting from the operations of an EMCS, an administrator (or the system itself) may be enabled to alter the configuration of the message costing functions. This may provide an adaptive feedback loop that implements or suggests changes to rules, message costing functions, or other functional aspects of an EMCS in response to how the messaging system is used. For example, the EMCS database may serve to help identify trends or use cases for a messaging system. An EMCS might process operational and message data to identify repeating patterns of desirable and/or undesirable messaging behavior and in response adjust its message costing method (such as by altering one or more factor weights) to promote or discourage messaging activity based on pattern recognition. This trend data may also be used by an EMCS to identify new messaging trends, to identify messaging behaviors that are most likely associated with new or changing business processes, or to identify messaging behaviors that need to be clarified as part of a "fine tuning" of a message costing rule, function or algorithm, etc.

In accordance with at least one embodiment of the invention, the system, apparatus, methods, processes, functions, and/or operations for message costing and budgeting described herein may be wholly or partially implemented in the form of a set of instructions executed by one or more programmed computer processors, such as a central processing unit (CPU) or microprocessor. Such processors may be incorporated in an apparatus, server, client, or other computing or data processing device or platform operated by, or in communication with, other components of the system.

Figure 5:
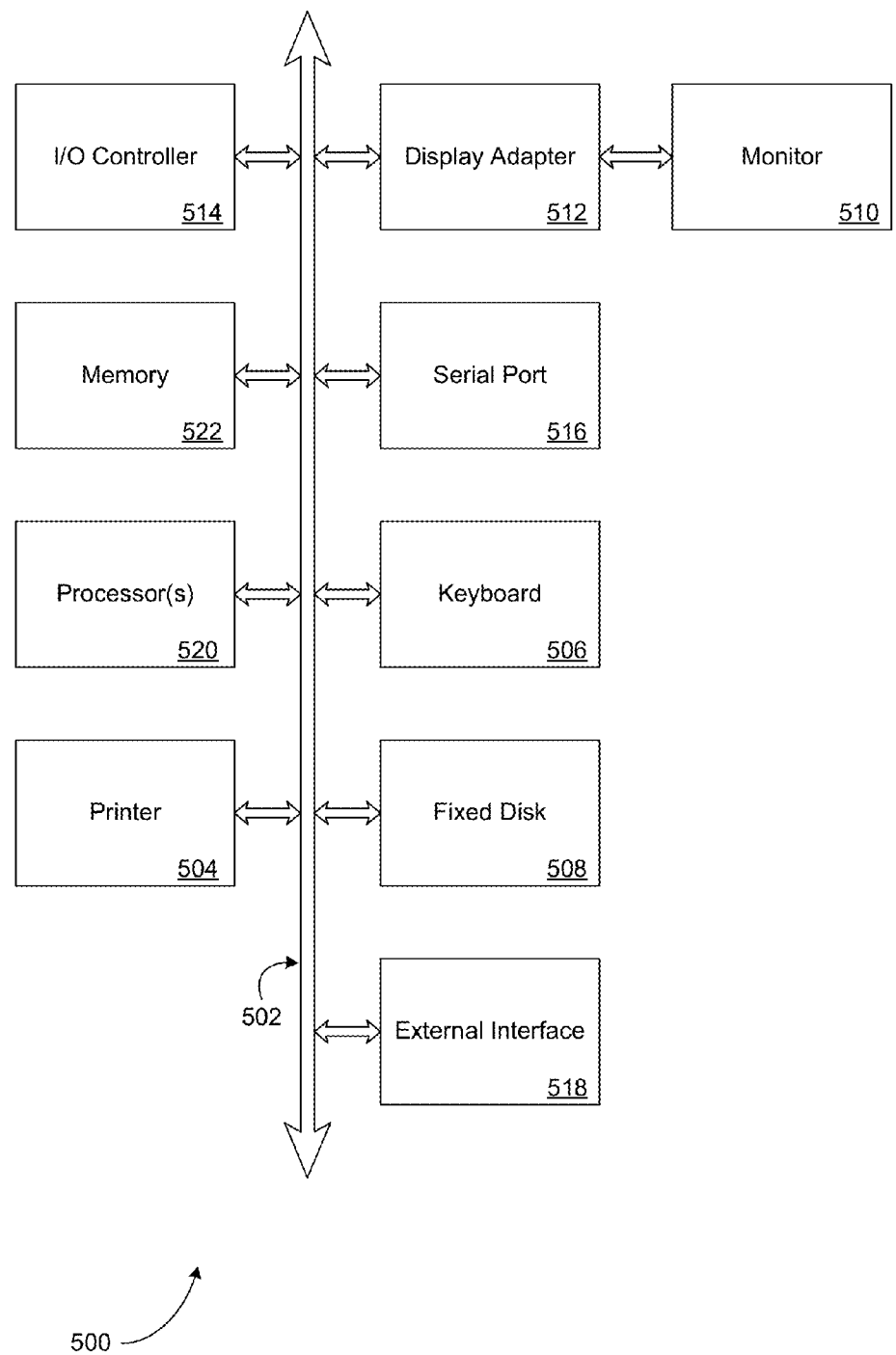
FIG. 5 is a diagram illustrating elements that may be present in an example computer architecture which may be configured to implement one or more of the inventive methods, processes, functions, or operations, in accordance with an embodiment of the invention.

By way of a non-limiting example, FIG. 5 is a diagram illustrating elements that may be present in an example computer architecture 500 which may be configured to implement one or more of the inventive methods, processes, functions, or operations, in accordance with an embodiment of the invention. The architecture 500 includes subsystems interconnected via a system bus 502. They subsystems may include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++, or Perl, using, for example, conventional or object-oriented techniques. The software code may be stored as a series of instructions, or commands on a computer readable medium, such as a random access memory (RAM) a read-only memory (ROM), a magnetic medium such as a hard-drive, a solid-state device such as a flash memory drive, or an optical medium such as a CD-ROM. Any such computer readable medium may reside on or within a single computational apparatus, and may be present on or within different computational apparatuses within a system or network.

Exemplary embodiments of the invention have been described in detail above and in the accompanying figures for illustrative purposes. However, the scope of the invention is defined by the claims below and is not limited to the embodiments described above or depicted in the figures. Embodiments differing from those described and shown herein, but still within the scope of the defined invention, are envisioned by the inventors and will be apparent to persons having ordinary skill in the relevant art in view of this specification as a whole. The inventors intend for the defined invention to be practiced other than as explicitly described herein. Accordingly, the defined invention encompasses all modifications and equivalents of the subject matter as permitted by applicable law.

What is claimed is:

1. A method of managing messaging communications, comprising:
   identifying a user of an electronic message system;
   determining an electronic message budget for the user, wherein the electronic message budget for the user depends upon a real-time or pseudo real-time value of one or more of Enterprise Resource Planning (ERP) data, Customer Relationship Management (CRM) data, eCommerce platform data, or financial data relevant to an organization;
   determining that the user is attempting to send an electronic message;
   calculating a cost of the electronic message;
   comparing the cost of the electronic message to the user's electronic message budget; and
   preventing the message from being delivered if the cost of the electronic message exceeds the user's electronic message budget.

2. The method of claim 1, wherein the electronic message budget for the user is determined based on one or more of the user's role within an organization, a project the user is working on, a task the user is working on, the season of the year in which the user attempts to send the message, the month of the year in which the user attempts to send the message, the time of day at which the user attempts to send the message, the demand on an organization's computing or network infrastructure, a stage in the organization's business cycle, or a number of employees in the organization.

3. The method of claim 1, wherein the electronic message budget is determined by an expression that includes one or more of a weighted sum of certain of the elements of data relevant to the operation of the organization, a non-linear function of certain of the elements of data relevant to the operation of the organization, or a multiplicative product of certain of the elements of data relevant to the operation of the organization.

4. The method of claim 1, wherein calculating the cost of the electronic message further comprises:
   accessing data describing one or more operational aspects of the organization; and
   combining the accessed data in accordance with a predetermined relationship or relationships.

5. The method of claim 4, wherein the accessed data includes one or more of Enterprise Resource Planning (ERP) data, Customer Relationship Management (CRM) data, eCommerce platform data, or financial data relevant to an organization.

6. The method of claim 5, wherein a value of the accessed data is determined in real-time or pseudo real-time.

7. The method of claim 1, wherein the cost of the electronic message is a function of one or more of the message length, the time of day the message was attempted to be sent, the date the message was attempted to be sent, a project status of the sender or a recipient of the message, a project type, a project priority, a type or number of message attachment(s), a number of recipients of the message, a type or role of the sender or of the recipient(s) of the message, a current status of one or more of the recipient(s) of the message, the number of messages from the same sender sent to a recipient over a specified time period, or the number of messages from the same sender sent to all recipients over a specified time period.

8. The method of claim 1, wherein preventing the message from being delivered if the cost of the electronic message exceeds the user's electronic message budget further comprises providing the user with an option which if agreed to, would enable the message to be delivered.

9. The method of claim 8, wherein the option is one or more of reducing the number of recipients, removing an attachment, purchasing additional message budget for the user, agreeing to perform a task, or undertaking an obligation.

10. A multi-tenant data processing system, comprising:
    one or more business related data processing applications installed in the system and accessible by a plurality of tenants of the multi-tenant data processing system;
    a data storage element accessible by a plurality of tenants of the multi-tenant data processing system;
    a processor programmed with a set of instructions, wherein when executed by the processor the instructions cause the system to
       determine that a user is attempting to send an electronic message;
       calculate a cost of the electronic message;
       compare the cost of the electronic message to the user's electronic message budget, wherein the electronic message budget for the user depends upon a real-time or pseudo real-time value of one or more of Enterprise Resource Planning (ERP) data, Customer Relationship Management (CRM) data, eCommerce platform data, or financial data relevant to an organization; and
       prevent the message from being delivered if the cost of the electronic message exceeds the user's electronic message budget.

11. The data processing system of claim 10, wherein the electronic message budget for the user is determined based on one or more of the user's role within an organization, a project the user is working on, a task the user is working on, the season of the year in which the user attempts to send the message, the month of the year in which the user attempts to send the message, the time of day at which the user attempts to send the message, the demand on an organization's computing or network infrastructure, a stage in the organization's business cycle, or a number of employees in the organization.

12. The data processing system of claim 10, wherein calculating the cost of the electronic message further comprises:
    accessing data describing one or more operational aspects of the organization; and
    combining the accessed data in accordance with a predetermined relationship or relationships.

13. The data processing system of claim 12, wherein the accessed data includes one or more of Enterprise Resource Planning (ERP) data, Customer Relationship Management (CRM) data, eCommerce platform data, or financial data relevant to an organization.

14. The data processing system of claim 13, wherein a value of the accessed data is determined in real-time or pseudo real-time.

15. The data processing system of claim 10, wherein the cost of the electronic message is a function of one or more of the message length, the time of day the message was attempted to be sent, the date the message was attempted to be sent, a project status of the sender or a recipient of the message, a project type, a project priority, a type or number of message attachment(s), a number of recipients of the message, a type or role of the sender or of the recipient(s) of the message, a current status of one or more of the recipient(s) of the message, the number of messages from the same sender sent to a recipient over a specified time period, or the number of messages from the same sender sent to all recipients over a specified time period.

16. The data processing system of claim 10, wherein preventing the message from being delivered if the cost of the electronic message exceeds the user's electronic message budget further comprises providing the user with an option which if agreed to, would enable the message to be delivered.

17. The data processing system of claim 16, wherein the option is one or more of reducing the number of recipients, removing an attachment, purchasing additional message budget for the user, agreeing to perform a task, or undertaking an obligation.

18. A method of managing messaging communications, comprising:
   identifying a user of an electronic message system;
   determining an electronic message budget for the user, wherein the budget is dependent upon one or more of Enterprise Resource Planning (ERP) data, Customer Relationship Management (CRM) data, eCommerce platform data, or financial data relevant to an organization, the user's role within an organization, a project the user is working on, a task the user is working on, or the resources of an organization's computing or network infrastructure that the role, project, or task associated with the user is allocated;
   determining that the user is attempting to send an electronic message;
   calculating a cost of the electronic message;
   comparing the cost of the electronic message to the user's electronic message budget;
   and preventing the message from being delivered if the cost of the electronic message exceeds the user's electronic message budget.

19. The method of claim 18, wherein the resources of the organization's computing or network infrastructure that the role, project, or task associated with the user is allocated depend upon a value of one or more elements of data relevant to the operation of an organization, wherein the one or more elements of data relevant to the operation of the organization include one or more of Enterprise Resource Planning (ERP) data, Customer Relationship Management (CRM) data, eCommerce platform data, or financial data.

20. The method of claim 18, wherein the cost of the electronic message is a function of one or more of the message length, the time of day the message was attempted to be sent, the date the message was attempted to be sent, a project status of the sender or a recipient of the message, a project type, a project priority, a type or number of message attachment(s), a number of recipients of the message, a type or role of the sender or of the recipient(s) of the message, a current status of one or more of the recipient(s) of the message, the number of messages from the same sender sent to a recipient over a specified time period, or the number of messages from the same sender sent to all recipients over a specified time period.

21. The method of claim 18, wherein preventing the message from being delivered if the cost of the electronic message exceeds the user's electronic message budget further comprises:
   providing the user with an option which if agreed to, would enable the message to be delivered.

22. The method of claim 21, wherein the option is one or more of reducing the number of recipients, removing an attachment, purchasing additional message budget for the user, agreeing to perform a task, or undertaking an obligation.

23. A method of managing messaging communications, comprising:
   identifying a user of an electronic message system;
   determining an electronic message budget for the user;
   determining that the user is attempting to send an electronic message;
   calculating a cost of the electronic message, wherein the cost of the electronic message is a function of one or more of Enterprise Resource Planning (ERP) data, Customer Relationship Management (CRM) data, eCommerce platform data, or financial data relevant to an organization, the message length, the time of day the message was attempted to be sent, the date the message was attempted to be sent, a project status of the sender or a recipient of the message, a project type, a project priority, a type or number of message attachment(s), a number of recipients of the message, a type or role of the sender or of the recipient(s) of the message, a current status of one or more of the recipient(s) of the message, the number of messages from the same sender sent to a recipient over a specified time period, or the number of messages from the same sender sent to all recipients over a specified time period;
   comparing the cost of the electronic message to the user's electronic message budget;
   and preventing the message from being delivered if the cost of the electronic message exceeds the user's electronic message budget.

24. The method of claim 23, wherein determining an electronic message budget for the user further comprises determining the budget wherein the budget is dependent upon one or more of the user's role within an organization, a project the user is working on, a task the user is working on, or the resources of an organization's computing or network infrastructure that the role, project, or task associated with the user is allocated.

25. The method of claim 24, wherein the resources of the organization's computing or network infrastructure that the role, project, or task associated with the user is allocated depend upon a value of one or more elements of data relevant to the operation of an organization, wherein the one or more elements of data relevant to the operation of the organization include one or more of Enterprise Resource Planning (ERP) data, Customer Relationship Management (CRM) data, eCommerce platform data, or financial data.

26. The method of claim 23, wherein preventing the message from being delivered if the cost of the electronic message exceeds the user's electronic message budget further comprises:
   providing the user with an option which if agreed to, would enable the message to be delivered.

27. The method of claim 26, wherein the option is one or more of reducing the number of recipients, removing an attachment, purchasing additional message budget for the user, agreeing to perform a task, or undertaking an obligation.

28. The multi-tenant data processing system of claim 10, wherein the one or more business related data processing applications installed in the system and accessible by a plurality of tenants of the multi-tenant data processing system include an Enterprise Resource Planning (ERP) application, a Customer Relationship Management (CRM) application, an eCommerce platform data processing application, or a financial data processing application.

29. An apparatus, comprising:
   a data storage element containing a set of executable instructions;

an electronic processor programmed with the set of instructions, wherein when executed by the processor the instructions cause the system to identify a user of an electronic message system;

determine an electronic message budget for the user, wherein the budget is dependent upon one or more of Enterprise Resource Planning (ERP) data, Customer Relationship Management (CRM) data, eCommerce platform data, or financial data relevant to an organization, the user's role within an organization, a project the user is working on, a task the user is working on, or the resources of an organization's computing or network infrastructure that the role, project, or task associated with the user is allocated;

determine that the user is attempting to send an electronic message;

calculate a cost of the electronic message, wherein the cost of the electronic message is a function of one or more of the message length, the time of day the message was attempted to be sent, the date the message was attempted to be sent, a project status of the sender or a recipient of the message, a project type, a project priority, a type or number of message attachment(s), a number of recipients of the message, a type or role of the sender or of the recipient(s) of the message, a current status of one or more of the recipient(s) of the message, the number of messages from the same sender sent to a recipient over a specified time period, or the number of messages from the same sender sent to all recipients over a specified time period;

compare the cost of the electronic message to the user's electronic message budget; and prevent the message from being delivered if the cost of the electronic message exceeds the user's electronic message budget.

30. The apparatus of claim 29, wherein preventing the message from being delivered if the cost of the electronic message exceeds the user's electronic message budget further comprises:

providing the user with an option which if agreed to, would enable the message to be delivered.

31. The apparatus of claim 30, wherein the option is one or more of reducing the number of recipients, removing an attachment, purchasing additional message budget for the user, agreeing to perform a task, or undertaking an obligation.

32. The apparatus of claim 29, wherein the resources of the organization's computing or network infrastructure that the role, project, or task associated with the user is allocated depend upon a value of one or more elements of data relevant to the operation of an organization, wherein the one or more elements of data relevant to the operation of the organization include one or more of Enterprise Resource Planning (ERP) data, Customer Relationship Management (CRM) data, eCommerce platform data, or financial data.

* * * * *